United States Patent [19]

List

[11] 4,047,636
[45] Sept. 13, 1977

[54] DEVICE FOR THE ARRANGEMENT, ALIGNMENT AND CORRECTLY POSITIONED FEED OF ARTICLES IN PARTICULAR HAVING ELONGATED SHAPE

[76] Inventor: Hans List, Lau-Strasse 51 (BRD), 7 Stuttgart 70, Germany

[21] Appl. No.: 611,977

[22] Filed: Sept. 10, 1975

[51] Int. Cl.² .......................................... B23Q 7/12
[52] U.S. Cl. .................. 221/161; 198/398; 221/289
[58] Field of Search .............. 198/287, 288, 289, 254, 198/255, 256, 190, 398, 382, 396; 221/159-161, 163, 253

[56] References Cited

U.S. PATENT DOCUMENTS

| 2,764,351 | 9/1956 | Broscomb et al. | 198/287 |
| 2,931,292 | 4/1960 | Ackley | 198/287 |
| 3,153,473 | 10/1964 | Margatoli | 198/287 |
| 3,272,118 | 9/1966 | Ackley | 198/287 |
| 3,884,347 | 5/1975 | Gallagher et al. | 221/159 |

Primary Examiner—Allen N. Knowles
Attorney, Agent, or Firm—Michael J. Striker

[57] ABSTRACT

A feed apparatus for elongated articles comprises a pair of endless helical springs having parallel spaced-apart reaches defining a generally horizontal transport path. The elongated elements are continuously displaced in a direction from an upstream end of the reaches to a downstream end thereof. Elongated articles such as gelatin capsules are loaded in random fashion onto the reaches at the upstream end so that at least some of these articles come to lie in the trough defined between these reaches, that is aligned parallel to the transport direction. The misaligned capsules fall off the upper reaches onto a return transport mechanism which automatically transports them back to the upstream end of forward transport mechanism.

23 Claims, 9 Drawing Figures

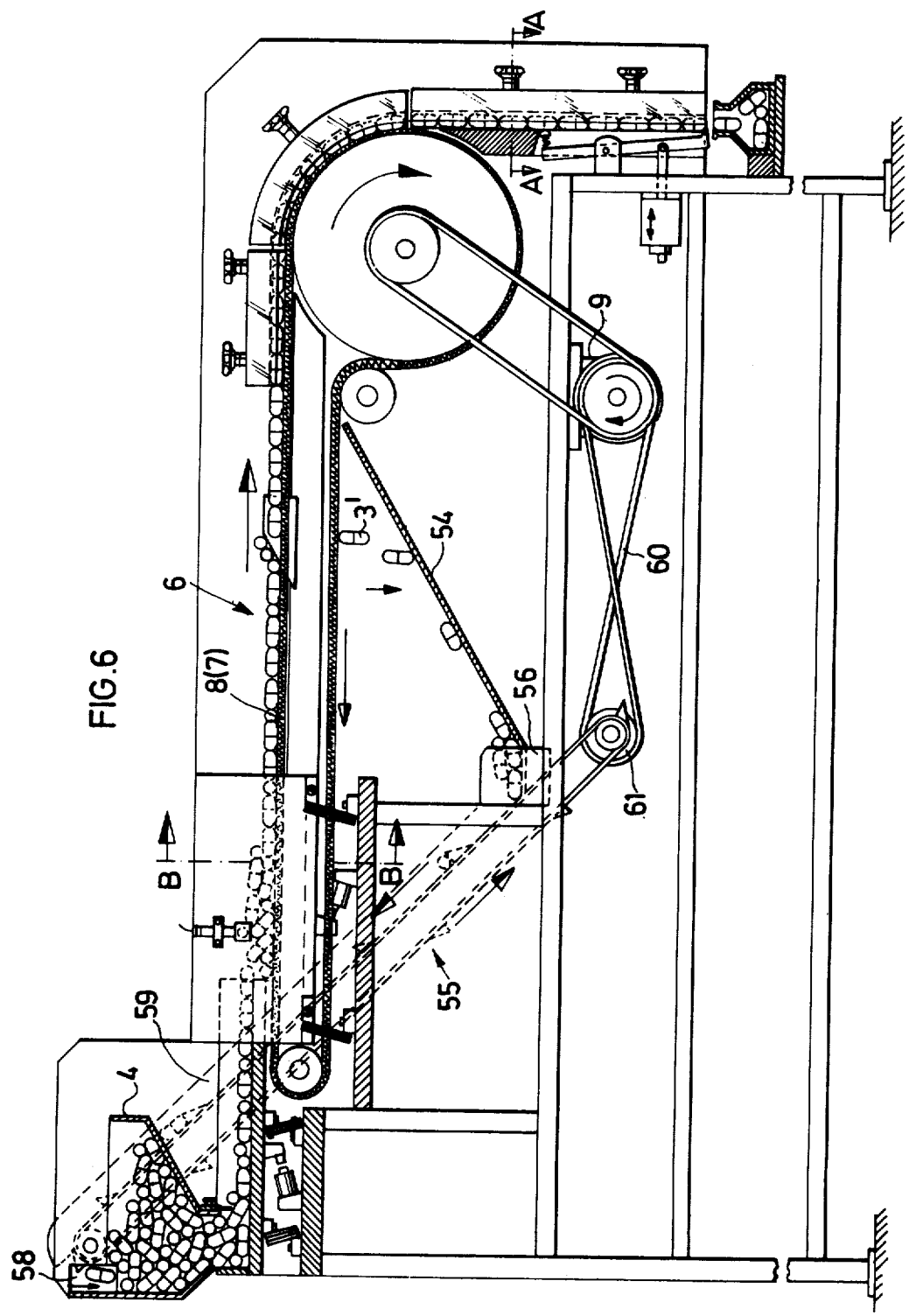

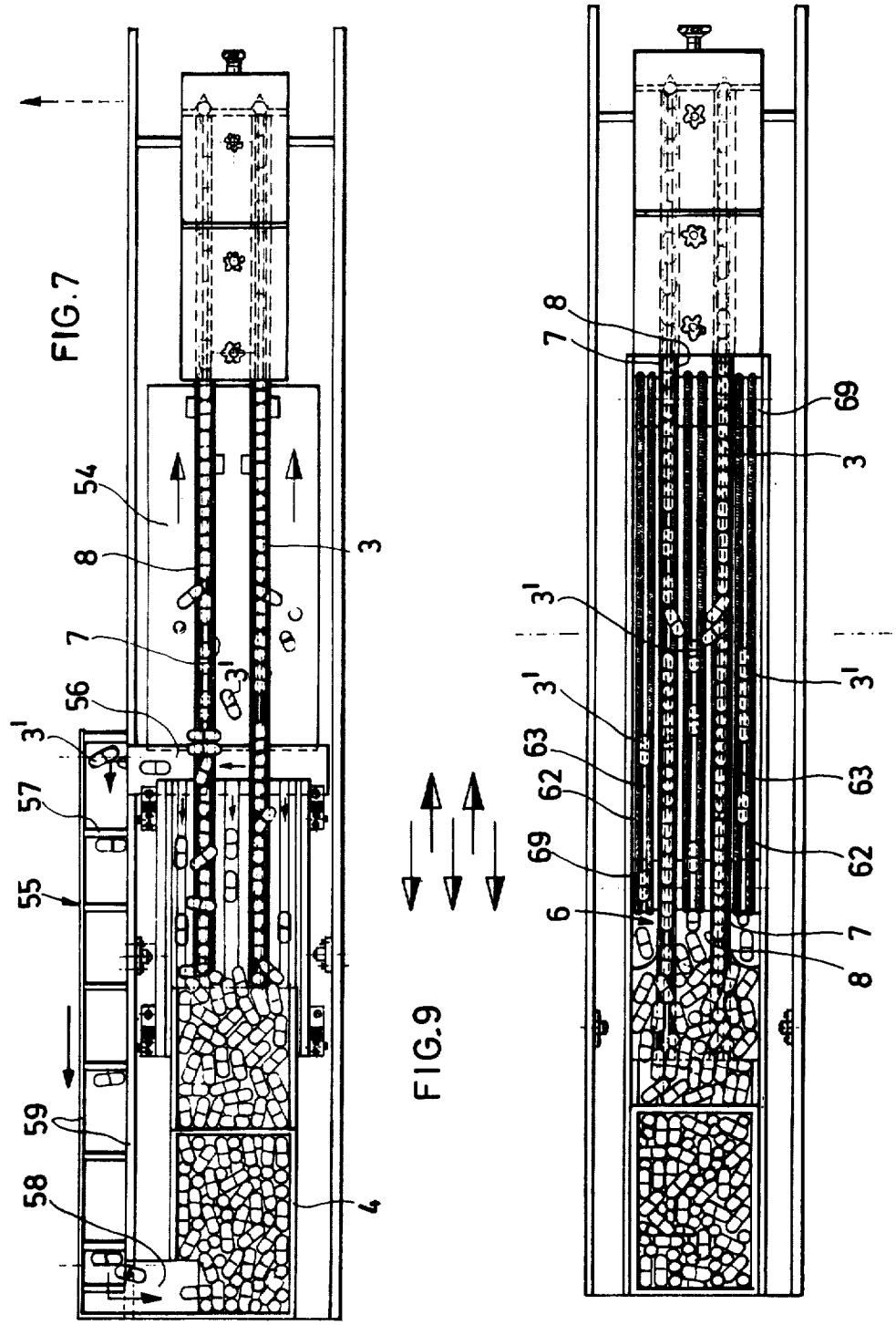

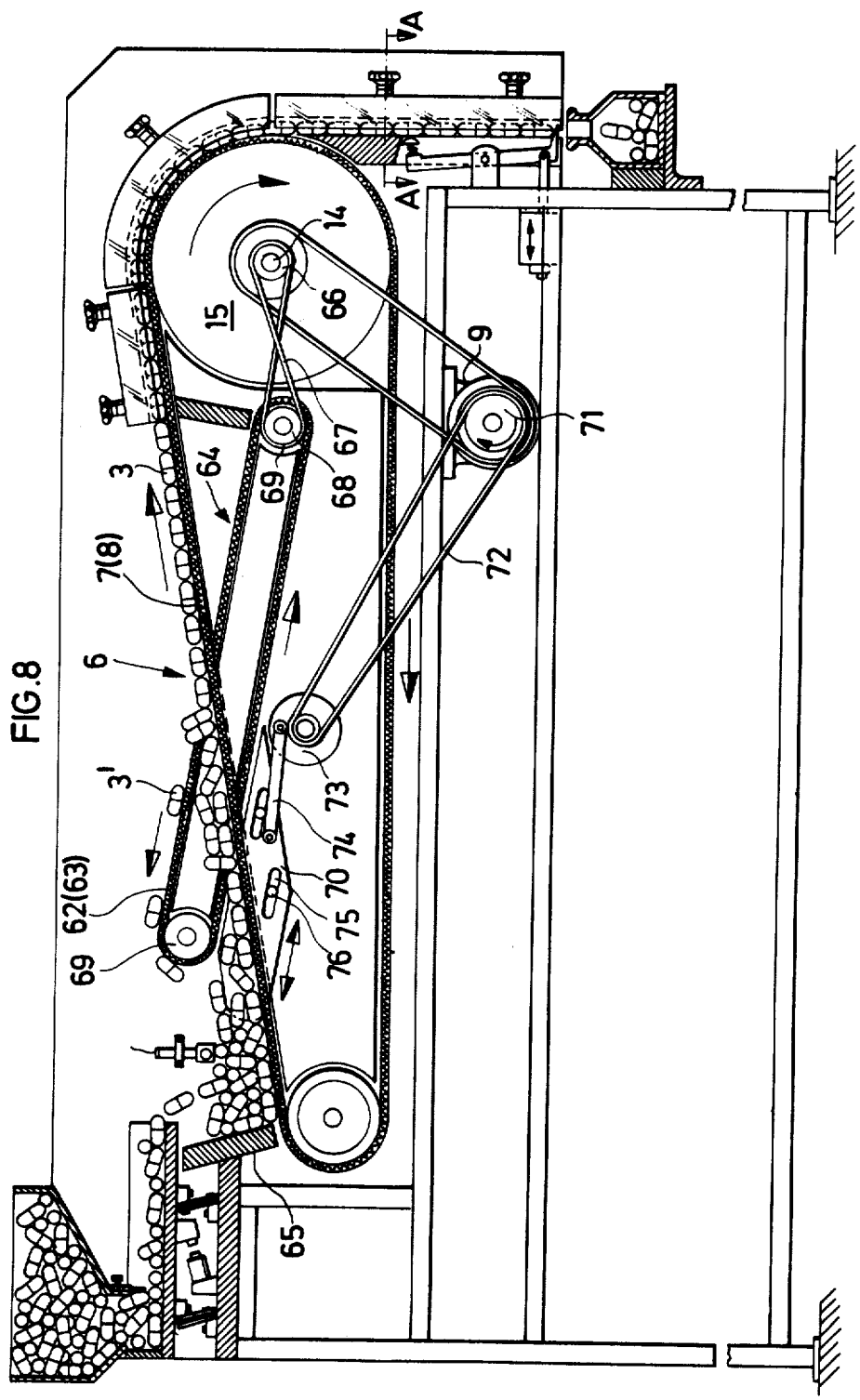

DEVICE FOR THE ARRANGEMENT, ALIGNMENT AND CORRECTLY POSITIONED FEED OF ARTICLES IN PARTICULAR HAVING ELONGATED SHAPE

BACKGROUND OF THE INVENTION

The present invention relates to a device for the arrangement, alignment, and correctly positioned feed to a receiving receptacle and/or a further processing station of articles of elongated shape randomly supplied thereto. Articles having elongated shape are to be understood to include hard gelatin capsules, soft gelatin capsules, rod-like tablets and similar articles and, of course, corresponding articles of wood, metal or plastic.

It is known that counting and drawing off of such articles causes considerable difficulties because, mainly, reliable aligning, forming and/or buffering of such articles prior to the actual process of counting, drawing off or other further processing is not satisfactorily possible with an arbitrarily reproducible result using the known means and methods.

Therefore in a conventional method the alignment or forming of the elongated bodies is achieved by causing the articles which are put into a hopper in an unordered fashion to slide axially into pipes penetrating through openings in the base of the hopper and therefore to be forced into the desired position in these pipes. In order to facilitate this process, the pipes which penetrate through the base of the hopper and which have a slightly larger inside diameter than the outer diameter of the articles perform a lifting motion. In spite of this, the efficiency and reliability of alignment of the articles to be achieved with such arrangements is insufficient.

The same is true for an arrangement for the alignment of elongated articles which comprises a supply receptacle, a conveyor chute connected to the supply receptacle as well as an inclined plate connected to the conveyor chute which has mutually parallel grooves which the elongated articles reach in a substantially unordered state. The grooved plate is followed by a perpendicular or inclined length of pipe such that a pipe is assigned to each groove. The articles thereby enter the pipes in an aligned state and are ordered therein so as to abut one against the other in the axial direction. The main difficulty in these devices is that part of the articles in general do not enter into the grooves but roll to the lower end of the grooved plate so that a correct entrance into the pipes is not possible.

SUMMARY OF THE INVENTION

It is an object of the present invention to furnish an arrangement for the arrangement, alignment and correctly position feed of articles to a receiving receptacle or a plurality of such receptacles or other receptacles in a further processing station which allows a reproducible fully automatic operation with higher and highest efficiency at greatest operating reliability and further is extremely economical.

The problem is solved in that a feeding station which comprises a supply receptacle for the article and a transport arrangement connected thereto is followed by a forward transport unit which comprises entraining elements for the articles which extend in a lengthwise direction, which transport the articles supplied thereto in an aligned position to a collecting portion to which a distributor arrangement for distributing a predetermined number of articles in receiving receptacles is assigned, and that return transport unit is comprised for taking over the articles which were not grasped in the correct position in the forward transport unit and those articles which fell from the forward transport unit and to return same to the sending station or to the starting zone of the forward transport unit. For this it has proven particularly advantageous to form the transport elements of the forward transport unit and possibly also of the return transport unit as endless elastic spirals which in pairs form the transport means for the articles. The coefficient of friction of the spirals, by a corresponding choice of the material to be used or by particular treatment of the spirals, may be fitted to the particular requirements and therefore also be adapted to the surface characteristics of the particular articles. It is of course also possible to subject the articles to treatment. Thus the surface of the articles can be sprayed with a powder or other such substance.

The invention will be explained in greater detail below with reference to the drawing, which shows a number of preferred embodiments of automatically operating devices for the correctly positioned feed of elongated articles to receiving receptacles.

BRIEF DESCRIPTION OF THE DRAWING

There is shown in.

SPECIFIC DESCRIPTION OF PREFERRED EMBODIMENTS

Figure 1:
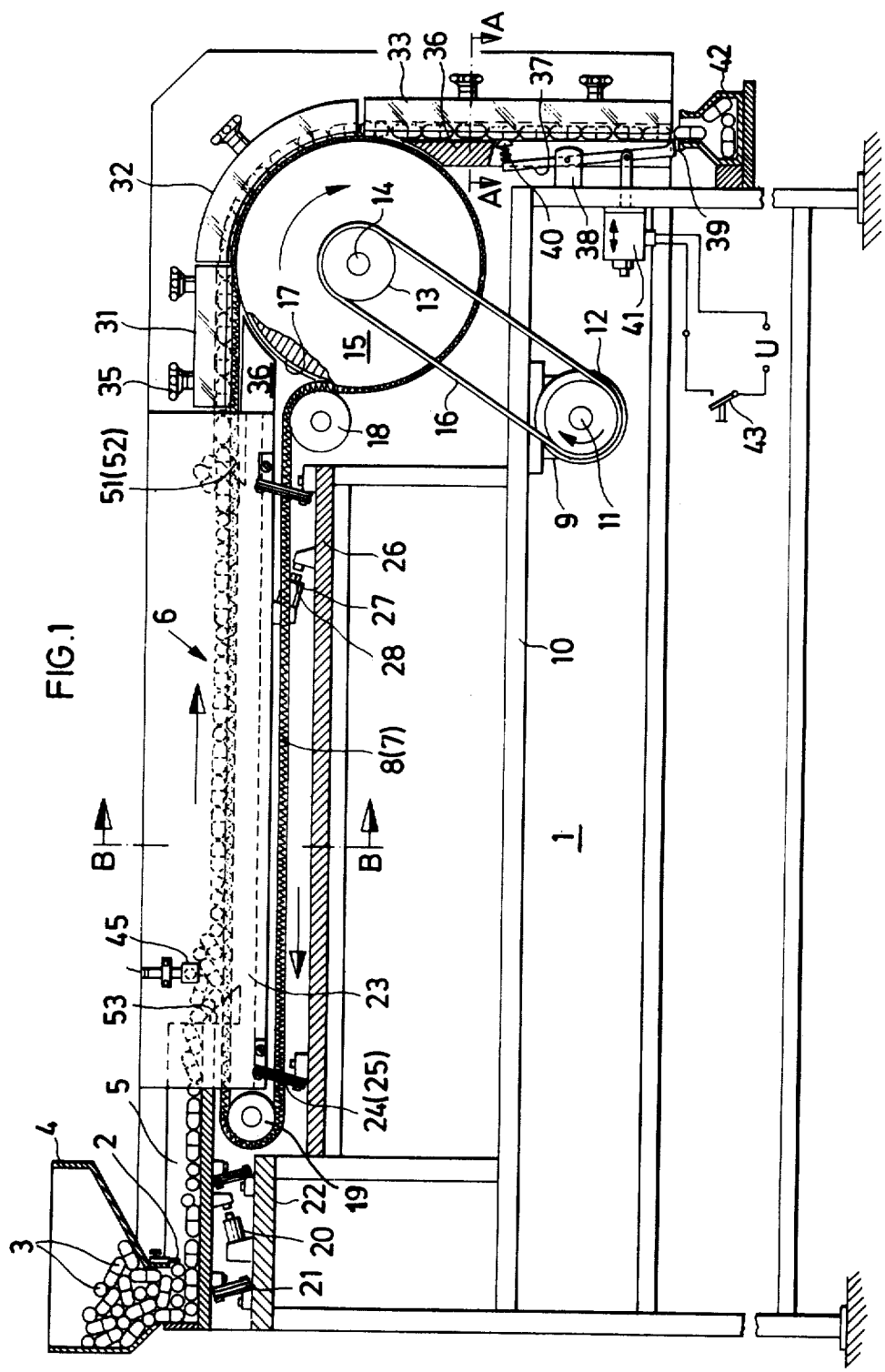
FIG. 1 a side view of the device of the present invention, partially in cross-section, FIG. 2 a top view of the device according to FIG. 1, FIG. 3 a view along section B-B of FIG. 1, FIG. 4 a view along section A-A of FIG. 1, FIG. 5 a schematic diagram of the diaphragm arrangement for the control of the vibratory conveyor, FIG. 6 a variation of the device of the present invention in a side view, partially sectional, FIG. 7 a plan view of the device shown in FIG. 6, FIG. 8 a side view of a further embodiment of the invention, partially in cross-section, and FIG. 9 a view of the device according to FIG. 8 from above.
Figure 2:
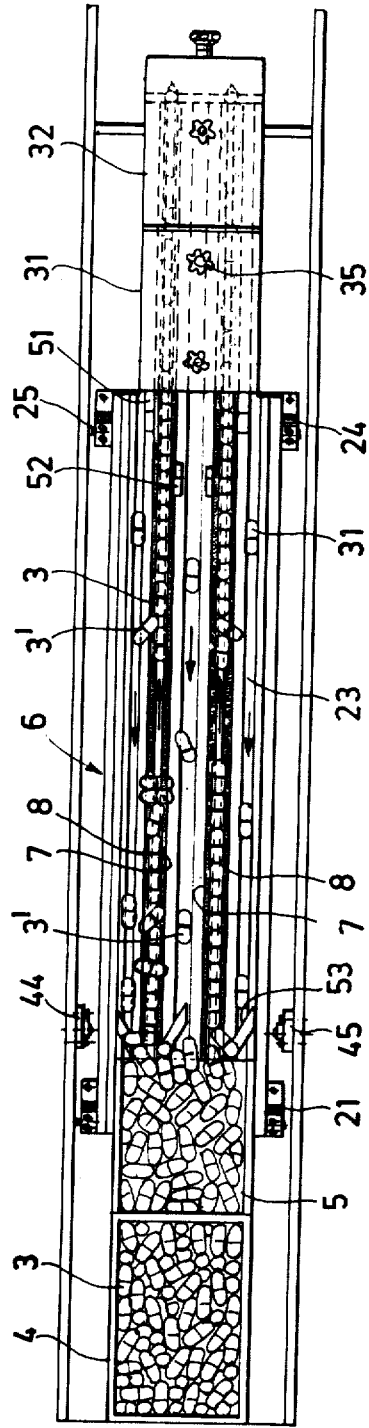

As shown particularly in FIGS. 1 and 2, a supply receptacle 4 for receiving elongated articles 3 in the form of gelatin capsules of the like is mounted on a frame-like bed plate 1 and has an outlet slide 2 which is adjustable in height. A vibratory conveyor is coupled to the supply receptacle 4. Vibratory conveyor 5 transports articles to a forward transport unit 6 which is spatially situated underneath it and which extends in the transport direction, that is in the lengthwise direction. It comprises endless spring spirals 7 and 8 which are supplied in pairs and which have a distance from one another such that each pair can take over the transport of the gelatin capsules. The forward transport unit 6 does not necessarily have to extend horizontally, it can be inclined either upwardly or downwardly.

The driving motor for the transport unit, which may if desired, be regulatable in speed, is designated by numeral 9 and is mounted on a longitudinal frame 10 of the bed plate. A drive pulley 12 is situated on motor shaft 11, a corresponding drive pulley 13 is mounted on shaft 14 of a drive roller 15, which is put into rotation by means of a toothed or V belt 16 or the like and which has grooves 17 which extend in a circumferential direction for an error free guiding and carrying along of springs 7 and 8. The drive roller 15 is directly preceeded by a guide roller 18. A deflecting roller 19 is situated in the starting region of the forward transport unit 6 underneath the vibratory conveyor 5, which is operated by one or a plurality of magnet devices 20 and which is supported by a base plate 22 through a restoring spring 21.

A vibratory conveyor 23 which acts as a counter unit and in a direction opposite to the direction of transport of the gelatin capsules 3 and which extends over almost the entire horizontal transport path of springs 7 and 8 is arranged between the forward and return portion of the spring spirals. The conveyor 23 abuts against a base plate 26 via restoring springs 24 and 25. The base plate 26 also carries the driving magnets 27 to which is assigned to an armature 28 which is rigidly fastened on the lower side of the floor of the chute. Of course a plurality of driving magnets and/or restoring springs can act on the conveyor chute 23.

Figure 3:
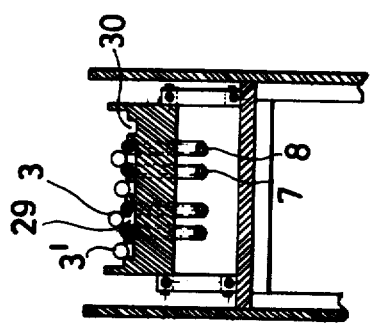

As is particularly easy to see with reference to FIG. 3, the conveyor chute 23 has a plurality of recesses 29 in the region of its base, which extend in a lengthwise direction for the undisturbed passage of springs 7, 8 as well as also lengthwise extending groove-like recesses 30 whose limiting edges serve as guides for those capsules 3' which fall off the spring spirals or other capsules during the transport. These gelatin capsules 3' are then transported back in a direction opposite to the direction of the transport of the aligned capsules 3 to the feed region. The transfer of the gelatin capsules which are unaligned and in unstable positions from the spring spirals into the recesses 30 which are present in the conveyor 23 or to the limiting edges of these recesses is made easier by the fact that the gelatin capsules which are on the spring spirals are situated spatially somewhat higher relative to the limiting edges of the recesses 30.

Preferably, covers 31, 32, 33 made of a transparent synthetic material are fastened to the forward transport unit 6 in the deflection region as well as along the vertically extending collection portion for the gelatin capsules. The covers serve to assure that the gelatin capsules are supplied to the subsequent processing station in the correct position and without gaps in the line.

Figure 4:
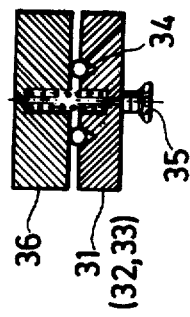

As shown in FIG. 4, the above-mentioned covers have wedge-shaped guide channels 34 in order to allow adaptation to the different diameters of the gelatin capsules or other elongated articles. The covers are removably fastened on adjusting pieces 36 or such like by means of manually operable screws 35.

In the lower portion of the vertically extending collecting portion, a distributing arrangement in the form of a rocker arm lever 37 is provided which is rotatably mounted in a guide 38 and which has, at its lower surface, a noseshaped projection 39 which covers the outlet channels for the gelatin capsules and which in its upper region has a spring-biased thrust member 40. The lever 37 is operated by means of a magnet 41. Instead of the lever, a parallel guide of conventional type can be utilized as a distributor arrangement.

The above-described device for the arrangement, alignment and correctly positioned feed of, particularly, elongated articles operates as follows;

The gelatin capsules 3 which are randomly put into the supply receptacle 4 are supplied to the forward transport unit 6 by means of the shaker loader 5. In this, the greater part of the gelatin capsules reaches the conveyor lanes which are embodied in the revolving spring spirals 7 and 8 which are arranged in pairs, while a part does reach the conveyor 23. The gelatin capsules which are correctly positioned on transport spirals 7 and 8 are automatically axially aligned one behind the other and transported away. After passing the deflecting station, the gelatin capsules reach the vertical or inclined selection portion and align themselves one after another without spaces inbetween. The desired number of gelatin capsules falls, after activation of magnet 41, into a receiving container or containers 42 which are at this point present at the mouth of the collection portion. The magnet 41 which is connected to a supply voltage U can be manually activated by means of a switch 43 in known fashion or automatically in synchronous fashion, a timing relay or drive roller 15 in connection with a contact member being utilized as synchronizing signal generators.

The gelatin capsules 3' which at first assume an unstable or indifferent position and which may in part be lying on top of other capsules 3, are either drawn off by the transport spiral 7, 8 and at the same time aligned, or they fall onto the conveyor chute 23 and are transported by this to the mouth of the shaker loader 5 and then are again subjected to the alignment process.

Figure 5:
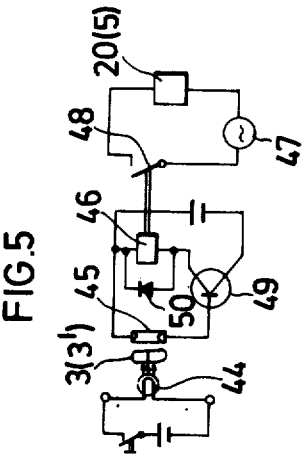

In order to achieve an even and continuous feed of the gelatin capsules to the forward transport unit 6, a diaphragm arrangement including a light transmitter 44 and a light receiver 45 is mounted following the outlet of the conveyor 5, as can be seen particularly in FIG. 5, and is used to control the conveyor 5. If light from the transmitter to the receiver is broken by the heaped gelatin capsules 3 or 3', then relay 46 of the diaphragm arrangement operates in known fashion to open a switch 48 which is connected in the energizing circuit 47 of the driving magnet 20 of the conveyor 5. This causes conveyor 5 to be deactivated. As soon as the beam sent by light transmitter 44 is again received by receiver 45, the energizing circuit of driving magnet 20 for conveyor 5 is closed by closing of switch 48 and the conveyor is again put into operation. Reference numeral 49 denotes a transistor while 50 denotes a diode.

In the region in which the gelatin capsules enter the guide channels, wedge-shaped barriers 51 and 52 are provided at the sides of the transport spirals, onto which those capsules 3' which are not aligned at this point in time pass and are pushed to the side, so that these reach the conveyor chute 23. Guide elements 53 which are also wedge-shaped are also provided at the mouth of the conveyor 5. These have the purpose to guide the gelatin capsules 3' which have been transported back into the region of the forward transport paths which are formed by the spring spiral pairs 7, 8.

In the device shown in FIGS. 6 and 7, a return transport unit for the gelatin capsules 3' which, during the forward transport and the alignment process fall from either between transport spirals 7, 8 or at the side of these, is provided, which comprises a slide 54 arranged underneath the forward transport unit 6 and an inclined conveyor device 55. The gelatin capsules fall onto slide 54, from this reach an inclined surface 56, to which the inclined conveyor device 55 is so coupled that the entraining elements 57 engage the gelatin capsules 3' which arrive from the inclined surface and transport these. The inclined conveyor device 55 is spatially located over the supply receptacle 4 in such a manner that gelatin capsules 3' fall on an inclined plane 58 during the deflection phase of the particular element 57. From the inclined plane 58 they again reach the supply receptacle 4. In order to prevent a lateral falling of the gelatin capsules 3' from the inclined transport arrangement 55, the latter has limiting borders 59. The drive of the inclined transport arrangement 55 can be effected by driving motor 9 via a crossed pulley drive 60 which drives a shaft 61.

In the device for the arrangement, alignment and correctly positioned feed of, in particular, elongated articles as shown in FIGS. 8 and 9, the forward transport unit 6 extend diagonally upward, the transport of the gelatin capsules 3 taking place correspondingly. For the transport back of the gelatin capsules 3' which fall from the transport spirals 7, 8 during the alignment and straightening process, return transport members 64 are supplied which are inclined in a direction opposite to the inclination of the forward transport unit 6. One of the return transport members 64 is arranged between the spring spiral pairs 7, 8 which effect the forward transport and the alignment of the gelatin capsules 3, and one each is supplied at the side of each spiral spring pair 7, 8. Transport unit 64 transports the nonaligned fallen gelatin capsules 3' back to the mouth of the shaker loader 5. A rearward limiter 65 below conveyor 5 allows a sufficient backlog volume. The drive for transport unit 64 can take place from the shaft 14 of drive roller 15 via a pulley 66 by means of crossed belt 67 which activates a drive wheel 68 to which are coupled the shafts for the reception and entrainment of spring spirals 62, 63. The deflection rollers of the return transport members 64 are denoted by 69.

To facilitate the loosening and the alignment of the gelatin capsules to keep the number of capsules transported back as low as possible, slider 70 which executes a back-and-forth movement is provided in the location where the capsules gather. It is activated by means of a pulley drive 72 which is driven by driving motor 9 via an additional drive pulley 71 by means of a belt drive 72, which drives an eccentric 73. A rod 72 is coupled to eccentric 73 which engages slider 70 which has guide slits 75 into which pins 76 enter. Slider 70 extends parallel to the return transport elements 64.

The device in accordance with the present invention of course is also suitable for articles of other shape, for example for articles having an oval, round or similar shape. Instead of a central drive for the different transport systems individual drives can be used.

I claim:

1. A device for the arrangement, alignment, and correctly positioned supply of elongated articles to receptacles, a further processing station, and the like, said device comprising a supply receptacle holding a multiplicity of said articles; a distributor means spaced from said supply receptacle for delivering a predetermined number of said articles to each of a plurality of receiving receptacles; a forward transport means for transporting articles from a supply station at said supply receptacle to said distributor means in aligned position, said forward transport means including at least two drive rollers, at least two deflecting rollers, and at least two endless spiral springs each spanned over a respective one of said drive and deflecting rollers; and return transport means for transporting from said distributor means to said supply station articles which were not correctly positioned in said forward transport means and which have fallen therefrom.

2. The device defined in claim 1, wherein said spiral springs are made of spring steel.

3. The device defined in claim 1, wherein said spiral springs are made of synthetic-resin material.

4. The device defined in claim 1, wherein at least one of said transport means includes a vibratory conveyor.

5. The device defined in claim 4; further comprising a light-barrier arrangement controlling said vibratory conveyor.

6. The device defined in claim 1; further comprising barrier means for pushing from said forward transport means into said return transport means articles which are out of said aligned position.

7. The device defined in claim 1, wherein said return transport means is a vibratory conveyor.

8. The device defined in claim 7, wherein said vibratory conveyor has recesses extending along said spiral springs and recesses having limited edges supporting articles being transported by said return transport means.

9. The device defined in claim 1; further comprising guide elements for said articles at said supply station.

10. The device defined in claim 1, wherein said return transport means includes a chute extending underneath said forward transport means and an inclined conveyor means connected to said forward transport means and having a sloped surface for feeding articles from said chute to said forward transport means at said station.

11. The device defined in claim 1, wherein said forward transport means slope upwardly in one direction and said return transport means slope upwardly in the opposite direction, said return transport means including at least two drive rollers, at least two deflecting rollers, and at least two endless spiral springs each spanned over a respective one of said drive and deflecting rollers.

12. The device defined in claim 11, wherein said return transport means includes a reciprocal slider extending parallel to the spiral springs of said return transport means.

13. The device defined in claim 12; further comprising a backward limiter underneath said station.

14. The device defined in claim 11; further comprising a drive motor connected to both of said transport means for driving the same.

15. The device defined in claim 12; further comprising common drive means for operating both of said transport means and said slider.

16. The device defined in claim 1, wherein said distributor means includes a magnetically activatable rocker lever having a hornshaped projection and above said projection a springbiased thrust member.

17. The device defined in claim 1, wherein said distributor means includes a covering having wedge-shaped recesses.

18. A feed apparatus for elongated articles, said apparatus comprising: a pair of elongated elements extending parallel to each other generally horizontally and defining a generally horizontal transport path, said elements being spaced to hold some of said articles aligned parallel to said path; means for feeding said articles in random fashion to said elements at an upstream end of said path; forward transport drive means connected to said elements for frictionally advancing articles in a transport direction along said path from said upstream end toward the opposite downstream end; and reverse transport means extending substantially the full length of said path for catching articles not properly aligned with said direction on said elements and transporting such misaligned articles back in a direction opposite said transport direction.

19. The apparatus defined in claim 18, further comprising a second pair of such elements parallel to the first-mentioned pair and spaced therefrom by a distance greater than the width of said articles transverse to their direction of elongation, whereby articles piled onto said elements at said downstream ends can fall between said pairs onto said reverse transport means.

20. The apparatus defined in claim 18 wherein said elements are flexible and endless and have straight reaches defining said path.

21. The apparatus defined in claim 20 wherein said reverse transport means includes at least one upwardly open trough extending along said path below said reaches.

22. The apparatus defined in claim 20 wherein said reverse transport means includes a drive independent of said forward transport drive means.

23. The apparatus defined in claim 20 wherein said forward transport drive means includes a pair of pulleys for each of said elements, one pulley of each pair being at said upstream end and the other at said downstream end.

* * * * *